United States Patent Office 3,398,797
Patented Aug. 27, 1968

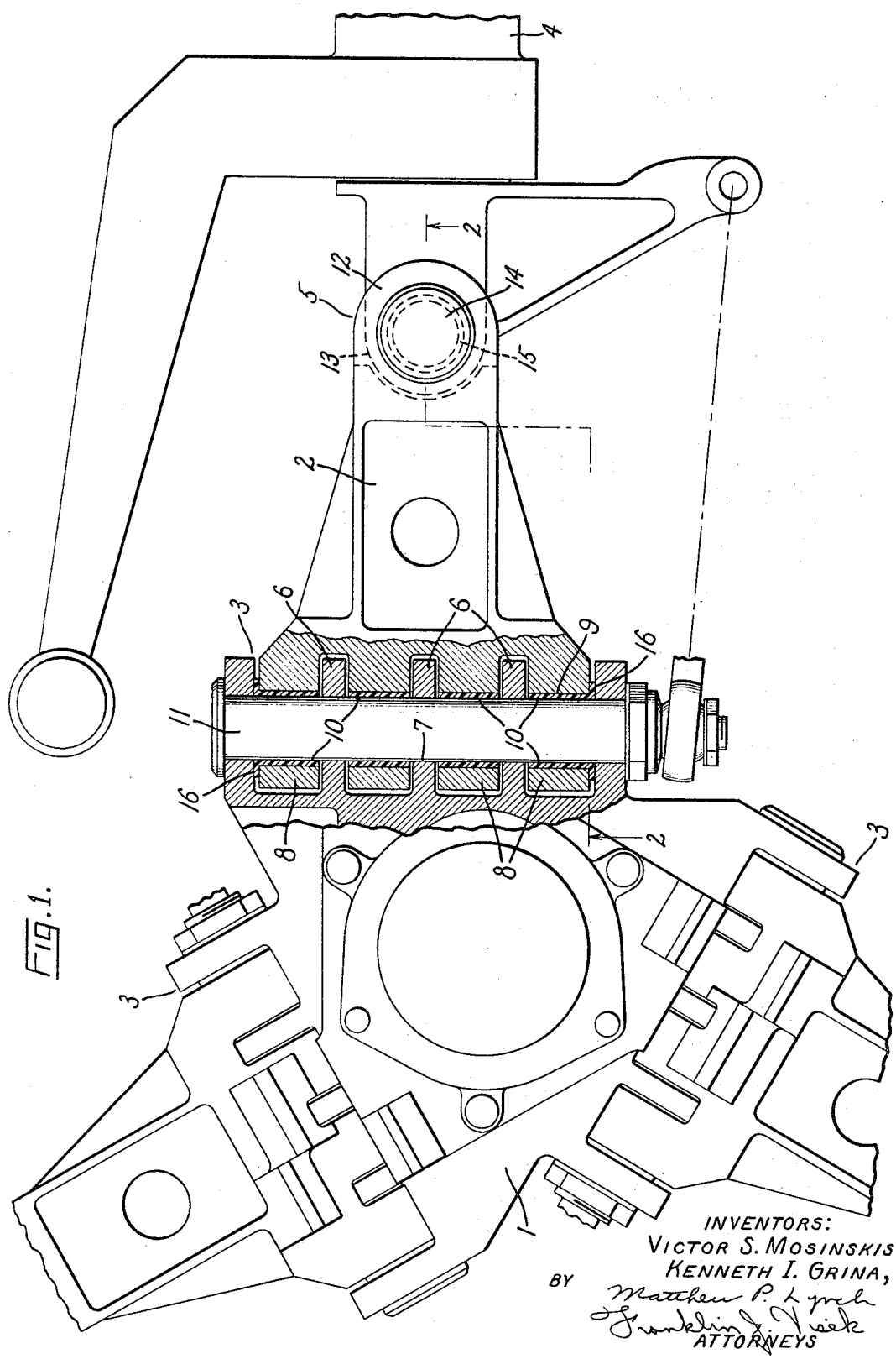

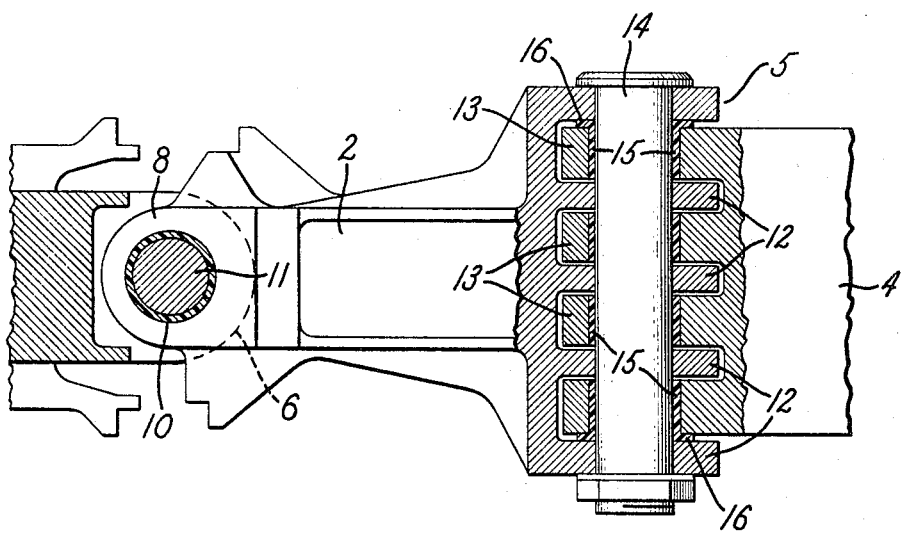

3,398,797
ARTICULATED ROTOR SYSTEM
Victor S. Mosinskis, Springfield, and Kenneth I. Grina, Media, Pa., assignors to The Boeing Company, Seattle, Wash., a corporation of Delaware
Filed May 18, 1966, Ser. No. 550,984
12 Claims. (Cl. 170—160.56)

ABSTRACT OF THE DISCLOSURE

A mechanism for allowing cyclic oscillations in an articulated rotor system wherein a rotor blade is pivotally attached to a rotor hub by a plurality of interleaved lugs, the lugs supporting a hinge pin substantially along its complete length thereby distributing resultant forces along the entire length of the pin.

---

This invention relates to an articulated rotor system and, more particularly, to dry lubricated fail-safe cyclically oscillating means for articulated rotor systems.

Each rotor blade of a rotary wing aircraft with articulated blade retention is, normally, provided with cyclically oscillating means which serve the dual function of allowing cyclically oscillating blade motions, and connecting the rotor blades to a drive means. These cyclically oscillating means are commonly and hereinafter referred to as "flapping" and "lead-lag" hinges. "Flapping" and "lead-lag" hinges serve to minimize blade bending moments, thereby allowing the use of a lighter blade. In addition, the use of "flapping" and "lead-lag" hinges tends to provide aerodynamic balance between the advancing and retreating blades.

Movements of the rotor blade in a vertical plane about the "flapping" hinge and in a horizontal plane about the "lead-lag" hinge are caused by external aerodynamic forces prevailing in the rotor blade's plane of rotation and are beyond the pilot's control.

In forward flight, dissymmetry of lift is caused by the relative wind acting as a head wind on the advancing blade to increase lift and acting as a tail wind on the retreating blade to decrease the lift.

To equalize lift throughout the cycle, the rotor blades are permitted to move about the "flapping" hinge. The advancing rotor blade flaps upward because of increased lift; the retreating rotor blade flaps downward because of decreased lift. The resulting relative wind causes a reduced angle of attack in the advancing blade and an increased angle of attack in the retreating rotor blade. In this way, lift tends to be equalized across the rotors' plane of rotation.

These hinges presently comprise bifurcated intermeshing lugs, having a registering bore therein. A hinge pin is inserted in the bore to provide a horizontal or vertical pivot axis.

In flight, dynamic and aerodynamic forces of great magnitude apply stresses to the lugs and pin of the hinge. Due to the presence of reversing moments on the rotor blade at right angles to the hinge pin axis, the outer lugs of the hinge are subjected to high fatiguing conditions. Under other than limited flight conditions, the outer lugs of the hinge are highly susceptible to fatigue failure.

If a bifurcated lug hinge is used, and a lug fails under the loading, the hinge is rendered incapable of retaining the rotor blade in flight. In this event, the rotor blade is torn free by centrifugal force and the aircraft is critically crippled.

Another problem inherent in the utilization of bifurcated lugs in a hinge is that the hinge pin is supported only on its ends. Consequently, there is an extended length of the hinge pin intermediate its ends that is unsupported. Since the resultant load from the rotor blade is acting on the center of the pin, failure to support the intermediate portion of the hinge pin requires an increased diameter pin to insure structural integrity.

The present invention solves the aforesaid problems by providing hinges having multiple lugs. The use of multiple lugs serves a dual purpose. The multiple lugs support the hinge pin along its entire length, thereby permitting the use of small diameter hinge pins. Oscillating motion about a smaller hinge pin results in reduced circumferential velocities on the periphery of the pin. The reduced circumferential velocities allow the use of dry bearings which are substantially lower in cost and complexity than the lubricated bearings presently being used. In addition, dry bearings provide a substantial weight reduction over the normal lubricated bearings. The importance of reducing the weight of an aircraft is obvious from the standpoint of greater load capability and range. However, a reduction in the weight of the rotor has many ancillary advantages in the flight characteristics of the helicopter. One ancillary advantage is the reduction in the mass of the rotor system, which causes a decrease in the centrifugal force acting on the rotor system. Another advantage is the substantial reduction in the overall size of the "flapping" and "lead-lag" hinges which greatly reduces the drag due to aerodynamic forces on the rotor system. An additional advantage is a reduction in vibration in the rotor system due to the decrease in the oscillating mass of the system.

In addition, the use of multiple lugs enables the hinge to continue to provide for the integrity of the hinged components, even though one of the multiple lugs has failed. The lugs are proportioned so that the inner lugs are capable of withstanding limited flight conditions should a failure of the outer lugs occur. Therefore, the multiple lug hinge provides a fail-safe feature to the rotor system.

An object of this invention is to provide fail-safe oscillating hinges for articulated rotor systems.

Another object of this invention is to provide a fail-safe hinge having a plurality of intermeshing connecting lugs.

Another object of this invention is to provide a fail-safe hinge having inner lugs capable of supporting the rotor blade if the outer hinge lugs should fail.

Another object of this invention is to provide a fail-safe hinge structure enabling the use of small diameter hinge pins.

Another object of this invention is to provide a fail-safe hinge structure permitting the use of dry bearings.

Another object of this invention is to provide a fail-safe oscillating hinge that is inexpensive to make and of relatively reduced mass to reduce the centrifugal forces acting on the rotor system.

Another object of this invention is to provide an articulated rotor system that is light in weight and relatively maintenance free.

Another object of this invention is to provide oscillating hinge means for articulated rotor systems that greatly reduces the drag on the rotor system due to aerodynamic forces.

Another object of this invention is to provide a streamlined articulated rotor system.

Another object of this invention is to provide oscillating hinge means for articulated rotor systems which greatly reduces the vibration in the rotor system because of its reduced mass.

Further objects and advantages of the invention will be brought out in the following specification wherein, for the purpose of completeness of disclosure, a preferred embodiment has been described in detail, without intending to limit the scope of the invention set forth in the appended claims.

The attached drawings illustrate the preferred embodiment of the invention, in which:

FIGURE 1 is a top view of an articulated rotor system showing a cut-away of a flapping hinge utilizing this invention.

FIGURE 2 is a side view of FIGURE 1 showing a partially cut-away lead-lag hinge utilizing the invention.

Referring now to the drawings, wherein like reference numbers designate like or corresponding parts throughout the several views; there is shown in FIGURE 1, an extension link 2 pivotably connected to a drive means or rotor hub 1 by a horizontal flapping hinge 3. A rotor blade assembly 4 is pivotally connected to the opposite end of the extension link 2 by a vertical lead-lag hinge 5.

The rotor hub 1, as illustrated, is adapted to drive three identical rotor blades, only one of which will be described for the sake of clarity. It will be understood, however, that the rotor hub 1 can be adapted to drive any number of rotor blades without departing from the spirit of the present invention.

The horizontal flapping hinge 3 consists of a plurality of spaced, substantially vertical lugs 6, extending outwardly from the rotor hub 1. The substantially vertical lugs 6 are aligned in parallel adjacent relationship, and have a substantially horizontal registering bore 7 therein. The extension link 2 has a plurality of complementary spaced lugs 8, extending outwardly from one end thereof, and adapted to intermesh with the lugs 6, of the rotor hub 1. The lugs 8 have a substantially horizontal registering bore 9 therein. The bore 9, of the lugs 8, is lined with a dry bearing 10, such as Teflon fabric, in order to reduce the friction in the flapping hinge 3. While I have used Teflon fabric as an example, it will be understood by those skilled in the art, that a number of other dry bearings can be used. In assembled position, the lugs 6, of the rotor hub 1, are adjacent the lugs 8, of the extension link 2; and the bore 7, of the lugs 6, is in alignment with the bore 9, of the lugs 8. In this manner, a connecting means such as a horizontal pin 11 may be inserted in the aligned bores of the lugs 6 and 8 to form the flapping hinge 3 about which the rotor blade assembly 4 pivots in a substantially vertical plane.

By utilizing the multiple lugs 6 and 8, the forces on the hinge pin 11 are distributed along its length; thereby permitting the use of a smaller diameter hinge pin than presently in use. Since the circumferential velocities on the periphery of the hinge pin 11 are directly proportional to the diameter of the pin 11, a reduction in the diameter of the pin 11 causes a decrease in the magnitude of the velocities. It is only because of the consequent decrease in the magnitude of the circumferential velocities that the dry bearings 10 can be utilized effectively without premature wearing, fatiguing and decomposing under the resultant loads.

The lead-lag hinge 5 is constructed substantially the same as the flapping hinge 3 and rotated approximately 90°, to allow the rotor blade assembly 4 to pivot in a substantially horizontal plane. Referring to FIGURE 2, which illustrates a side view of the lead-lag hinge 5 partially cut away, there is shown a plurality of substantially horizontal lugs 12 secured to the opposite end of the extension link 2. A plurality of complementary lugs 13 are secured to the root end of the rotor blade assembly 4. The lugs 12 and 13 are substantially the same as the lugs 6 and 8, of the flapping hinge 3, and are rotated approximately 90°. In assembled position, the lugs 12 and 13 are adapted to receive a connecting means, such as a vertical hinge pin 14 about which the rotor blade assembly 4 pivots in a substantially horizontal plane. Because of the decrease in the circumferential velocities on the periphery of the pin 14, for the reason mentioned hereinbefore, dry bearings 15 are utilized on the lugs 13.

It will be noted from the above description of both the flapping hinge 3 and the lead-lag hinge 5, that both hinges are constructed in an identical manner. The flapping hinge 3 and the lead-lag hinge 5 allow the rotor blade assembly 4 to pivot in a substantially vertical and horizontal plane, respectively.

The utilization of the multiple lugs 6, 8, 12, and 13 provides a fail-safe feature in the event of failure of an individual lug. In addition, the multiple lugs allow the utilization of smaller diameter hinge pins which, in turn, permit the use of dry bearings. The utilization of dry bearings on the flapping hinge 3 and the lead-lag hinge 5 greatly reduces the overall cost and complexity of the articulated rotor system. In addition, dry bearings provide a substantial weight reduction over the normal lubricated bearings. The importance of reducing the weight of an aircraft is obvious from the standpoint of greater load capability and range. However, a reduction in the weight of the rotor has many ancillary advantages in the flight characteristics of the helicopter. One ancillary advantage is the reduction in the mass of the rotor system, which causes a decrease in the centrifugal force acting on the rotor system. Another advantage is the substantial reduction in the overall size of the "flapping" and "lead-lag" hinges which greatly reduces the drag due to aerodynamic forces on the rotor system. An additional advantage is the reduction in the vibration in the rotor system due to the decrease in the oscillating mass of the system.

It will be noted from the drawings that the dry bearings 10 and 15 have a flange 16 on their outer ends. The flange 16 prevents the intermeshing lugs 6 and 8, on the "flapping" hinge 3, and the lugs 12 and 13 on the "lead-lag" hinge 5 from moving in a longitudinal direction along the axis of their respective hinge pins 11 and 14.

For the purposes of exemplification, particular embodiments of the invention have been shown and described according to the present understanding thereof. However, it will be apparent that changes and modifications in the arrangement and construction of the parts thereof may be resorted to without departing from the spirit and scope of the invention.

We claim:

1. In an articulated rotor system, an oscillating hinge means comprising:
   a rotor hub;
   at least three lugs having a registering bore therein extending outwardly from said rotor hub;
   a rotor blade assembly;
   at least three lugs having a registering bore therein extending inwardly from said rotor blade assembly;
   a dry bearing mounted in said bore of said lugs extending from said rotor blade assembly;
   an extension link;
   at least three complementary lugs having a complementary registering bore therein extending inwardly from one end of said extension link, and adapted to intermesh with said lugs on said rotor hub;
   a dry bearing mounted in said bore of said lugs extending from said extension link;
   a hinge pin adapted to be inserted in said bores of said lugs on said rotor hub and said extension link, said hinge pin being supported by said lugs substantially along its entire length;
   at least three complementary lugs having a complementary registering bore therein extending outwardly from the opposite end of said extension link, and adapted to intermesh with said lugs of said rotor blade assembly; and
   a hinge pin adapted to be inserted in said bore of said lugs on said rotor blade assembly and said extension link, said hinge pin being supported by said lugs substantially along its entire length.

2. In an articulated rotor system, a cyclically oscillating hinge means comprising:
   a rotor hub;
   at least three substantially vertical, spaced lugs having a substantially horizontal registering bore therein extending outwardly from said rotor hub;
a rotor blade assembly;
at least three substantially horizontal, spaced lugs having a substantially vertical registering bore therein extending inwardly from said rotor blade assembly;
a Teflon bearing mounted in said vertical bore of said horizontal lugs;
an extension link;
at least three substantially vertical, spaced complementary lugs having a complementary substantially horizontal registering bore therein extending inwardly from one end of said extension link, and adapted to intermesh with said vertical lugs of said rotor hub;
a Teflon bearing mounted in said horizontal bore of said vertical lugs extending from said extension link;
a hinge pin adapted to be inserted in said horizontal bore of said vertical lugs on said rotor hub and said extension link, said hinge pin being supported by said lugs substantially along its entire length;
at least three substantially horizontal, spaced complementary lugs having a complementary substantially vertical registering bore therein extending outwardly from the opposite end of said extension link and adapted to intermesh with said horizontal lugs of said rotor assembly; and
a hinge pin adapted to be inserted in said vertical bore of said horizontal lugs on said rotor blade assembly and said extension link, said hinge pin being supported by said lugs substantially along its entire length.

3. In an articulated rotor system having a drive means and a rotor blade assembly, a cyclically oscillating means comprising:
at least three hub lugs having a registering bore therein extending outwardly from said drive means;
at least three complementary blade lugs having a complementary bore therein extending inwardly from said rotor blade assembly, said blade lugs having a thickness substantially equal to the space separating said hub lugs and disposed therein in interleaved relationship to said hub lugs; and
a pin disposed in said registering bores for pivotally connecting said lugs, said pin being supported by said lugs substantially along its entire length.

4. An oscillating means in accordance with claim 3 wherein a dry bearing is disposed between said blade lugs and said pin.

5. In an articulated rotor system having a drive means and a rotor blade assembly, a cyclically oscillating means comprising:
at least three hub lugs having a registering bore therein secured to said drive means;
at least three complementary blade lugs having a complementary bore therein secured to said rotor blade assembly, said blade lugs having equidistant center lines and being disposed in interleaved relationship to said hub lugs; and
a pin disposed in said registering bores for pivotally connecting said lugs, said pin being supported by said lugs substantially along its entire length.

6. An oscillating means in accordance with claim 5 wherein a dry bearing is disposed between said blade lugs and said pin.

7. An oscillating means in accordance with claim 5 wherein said blade lugs are symmetrical.

8. An oscillating means in accordance with claim 5 wherein a hub lug is disposed on each side of said blade lugs.

9. An oscillating means in accordance with claim 5 wherein said blade lugs are of equal thickness.

10. An oscillating means in accordance with claim 5 wherein said hub lugs disposed on the outer side of the outermost blade lugs are of a thickness greater than the remaining hub lugs.

11. In an articulated rotor system having a drive means and a rotor blade assembly, a cyclically oscillating means comprising:
at least three hub lugs having a registering bore therein secured to said drive means, said hub lugs having equidistant center lines;
at least three complementary blade lugs having a complementary bore therein secured to said rotor blade assembly and disposed in interleaved relationship to said hub lugs; and
a pin disposed in said registering bores for pivotally connecting said lugs, said pin being supported by said lugs substantially along its entire length.

12. An oscillating means in accordance with claim 11 wherein a dry bearing is disposed between said blade lugs and said pin.

References Cited
UNITED STATES PATENTS

| | | | |
|---|---|---|---|
| 2,232,289 | 2/1941 | Upson | 170—160.25 |
| 2,447,118 | 8/1948 | Gluhareff | 170—160.56X |
| 2,511,687 | 6/1950 | Andrews | 170—160.55X |
| 3,135,333 | 6/1964 | Cruz et al. | 170—160.12 |

EVERETTE A. POWELL, JR., *Primary Examiner.*